US012337630B1

(12) United States Patent
Lindsay

(10) Patent No.: US 12,337,630 B1
(45) Date of Patent: Jun. 24, 2025

(54) TRAILER HITCH SYSTEM AND DESIGNS

(71) Applicant: ExoTek Trailers, Inc., Cave Creek, AZ (US)

(72) Inventor: Howard Alvin Lindsay, Cave Creek, AZ (US)

(73) Assignee: ExoTek Trailers, Inc., Cave Creek, AZ (US)

( * ) Notice: Subject to any disclaimer, the term of this patent is extended or adjusted under 35 U.S.C. 154(b) by 330 days.

(21) Appl. No.: 17/973,681

(22) Filed: Oct. 26, 2022

Related U.S. Application Data

(63) Continuation-in-part of application No. 16/941,321, filed on Jul. 28, 2020, now Pat. No. 11,498,375.
(Continued)

(51) Int. Cl.
B60D 1/46 (2006.01)
B60D 1/06 (2006.01)
(Continued)

(52) U.S. Cl.
CPC ............... B60D 1/46 (2013.01); B60D 1/06 (2013.01); B60P 1/43 (2013.01); B62D 63/06 (2013.01)

(58) Field of Classification Search
CPC ............ B60P 1/431; B60D 1/46; B62D 63/06
See application file for complete search history.

(56) References Cited

U.S. PATENT DOCUMENTS

| 3,383,119 A | 5/1968 | Carroll |
| 3,692,332 A | 9/1972 | Pappatheodoru |

(Continued)

FOREIGN PATENT DOCUMENTS

| CN | 102303558 B | * | 1/2013 |
| EP | 0 111 855 A2 | | 6/1984 |

(Continued)

OTHER PUBLICATIONS

Mar. 30, 2022 Non-Final Office Action in U.S. Appl. No. 16/941,321.
(Continued)

Primary Examiner — Anne Marie M Boehler
Assistant Examiner — Hosam Shabara
(74) Attorney, Agent, or Firm — Law Offices of Damon L. Boyd, PLLC

(57) ABSTRACT

A telescoping trailer hitch system for a vehicle such as a car, truck, or SUV, and trailer comprising an overcab portion substantially parallel to a roof of the truck. The telescoping trailer hitch system comprises an expansion mechanism support, a series of dampers, a piston, an extension tube, and an outer support structure coupled to a hitch connector. The expansion mechanism is within the expansion mechanism support and the piston, the extension tube surrounds the piston, and the outer support structure surrounds the extension tube. Activation of the expansion mechanism exerts a force on the piston and the extension tube, causing the piston and the extension tube to slide out of the outer support structure, extending the hitch connector, and wherein deactivation of the expansion mechanism exerts a force on the piston and the extension tube, causing the piston and the extension tube to slide into the outer support structure, retracting the hitch connector.

A towable trailer comprising walls and a frame that is at least semi-external to the walls. The towable trailer frame may be comprised of welded aluminum beam elements to create a truss structure, and the beam elements protrude beyond the walls.

A trailer entry system comprising a ramp door, wherein the ramp door is attached to a trailer frame and is removed or inserted into a pocket configured in the trailer frame for storage when the trailer is in transit. The ramp door may (Continued)

further comprise a non-skid tape or other friction coating to improve traction in both wet and dry conditions.

13 Claims, 11 Drawing Sheets

Related U.S. Application Data

(60) Provisional application No. 62/922,159, filed on Jul. 29, 2019.

(51) Int. Cl.
*B60P 1/43* (2006.01)
*B62D 63/06* (2006.01)

(56) References Cited

U.S. PATENT DOCUMENTS

| | | | |
|---|---|---|---|
| 3,756,624 A | 9/1973 | Taylor | |
| 3,779,297 A | 11/1973 | Quick | |
| 3,870,341 A | 3/1975 | Younger | |
| 3,887,220 A | 6/1975 | Hall | |
| 4,498,418 A * | 2/1985 | Chumley | B60P 3/04 |
| | | | 119/408 |
| 4,850,788 A * | 7/1989 | Dickson | B60P 1/431 |
| | | | 14/71.1 |
| 4,854,631 A * | 8/1989 | Laursen | B60P 3/32 |
| | | | 296/168 |
| 5,348,329 A | 9/1994 | Morin et al. | |
| 7,918,465 B2 * | 4/2011 | Metzger | B60P 1/027 |
| | | | 280/439 |
| 8,910,965 B2 * | 12/2014 | LaPrade | B60D 1/06 |
| | | | 280/509 |
| 9,340,087 B2 * | 5/2016 | Atkinson | B62D 33/037 |
| 9,475,529 B2 * | 10/2016 | Leisner | B60P 1/435 |
| 11,173,824 B1 * | 11/2021 | Hastings | B60P 1/28 |
| 2008/0238138 A1 | 10/2008 | Vallee | |
| 2019/0351807 A1 * | 11/2019 | Coulter | B60P 3/34 |
| 2020/0055548 A1 * | 2/2020 | Fisher | B60P 7/06 |

FOREIGN PATENT DOCUMENTS

| | | |
|---|---|---|
| EP | 0 876 929 A1 | 11/1998 |
| GB | 2 093 783 A | 9/1982 |
| WO | 8601780 A1 | 3/1986 |

OTHER PUBLICATIONS

Jun. 29, 2022 Reply to Non-Final Office Action in U.S. Appl. No. 16/941,321.

Jul. 15, 2022 Notice of Allowance and Issue Fee Due in U.S. Appl. No. 16/941,321.

\* cited by examiner

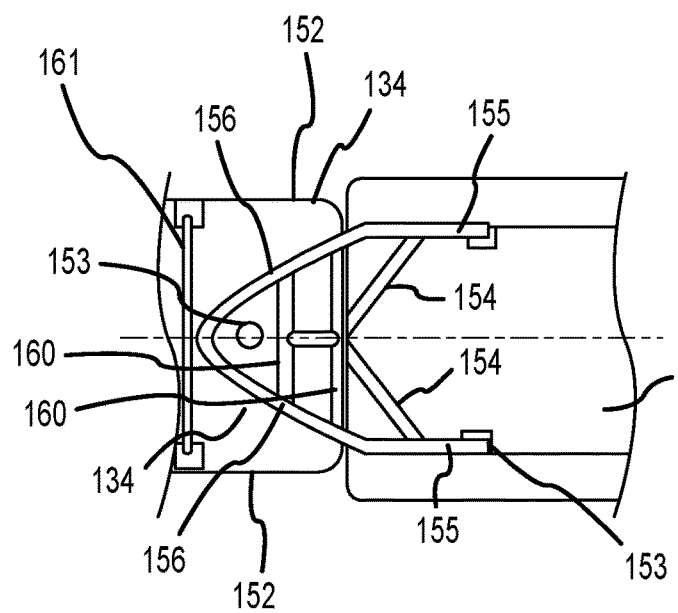
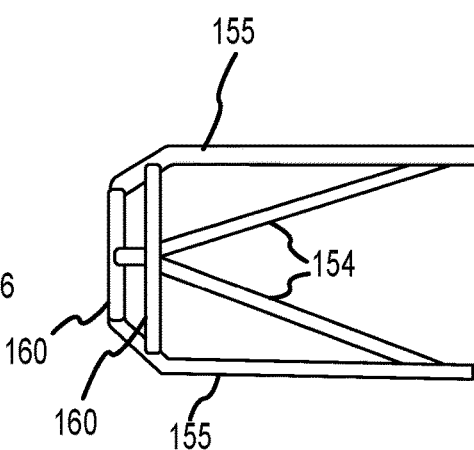
FIG.6A    FIG.6B
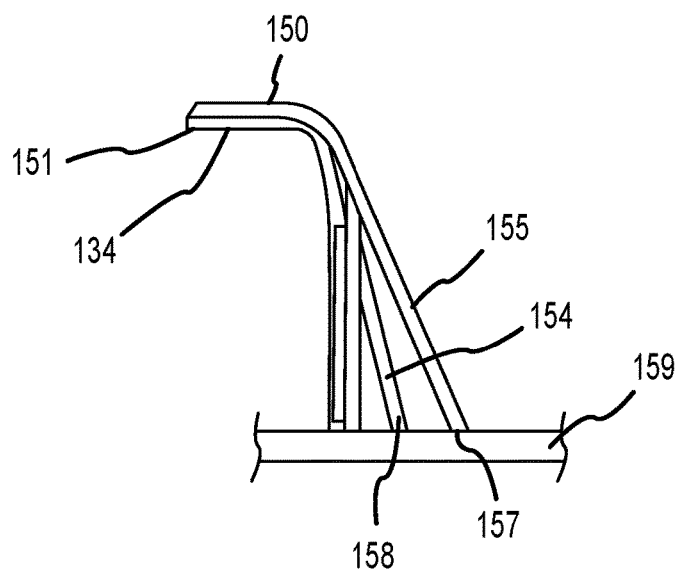
FIG.6C

TRAILER HITCH SYSTEM AND DESIGNS

CROSS REFERENCE TO RELATED APPLICATIONS

This This Patent Application is continuation-in-part of U.S. Pat. No. 11,498,375, entitled "Trailer Hitch System and Designs" which issued Nov. 15, 2022, which is related to and claims priority under 35 U.S.C. § 119 (e) to U.S. Provisional Patent Application No. 62/922,159, entitled "Hyhitch Trailer Design and Related Innovations," filed Jul. 29, 2019; both of which are hereby incorporated by reference in their entirety for all purposes.

BACKGROUND

Field

The present disclosure relates to improved trailer hitches and related systems and designs.

Background

There are many examples of mechanisms for attaching towable trailers to other vehicles. These include recreational vehicle trailers (also called an "RV") for providing living quarters for camping and traveling, horse trailers, boat trailers, car, motorcycle, and ATV trailers, and work, cargo, and utility trailers, among many others. The vehicles used to pull these trailers have evolved over time, as have the corresponding trailer designs and corresponding connection mechanisms (also called the "hitch").

Pulling trailers behind powered vehicles has occurred since the inception of the automobile. By the 1950's, it was common to use regular passenger cars for pulling trailers. Because the cars had power and weight carrying limitations, the trailers were typically light weight designs and the typical manner in which they were connected to the car was known as a traditional "bumper mount." Over time, the modern pick-up truck evolved as the primary powered vehicle for pulling trailers and the conventional "bumper mount" is the attachment technique that is most common.

As trailers evolved and became larger and heavier, attachment methods also evolved, as did the type of trucks that pull them. In this regard, a system commonly referred to as a "5th wheel" attachment hitch has become the current state of the art for these larger and/or heavier trailers with widespread use with both light duty trailers and with heavy duty commercial applications (e.g., semi-trucks).

While there are many benefits of a 5th wheel system over a conventional bumper mounted system, most of them are tied to the ability to move the trailers connection pin (and therefore its weight) forward over the truck's rear axle. This improves the weight carrying capability of the truck and the dynamic stability of the "entire system" (i.e., the vehicle and trailer, together) by helping balance the trailer's tongue (or pin) weight over all truck tires (typically, four to six tires) and is the primary reason for the improvement of the 5th wheel hitch designs in trailering capability and stability over bumper pull designs.

Another benefit of 5th wheel hitch systems is that the hitch's higher vertical location (mounted in the bed portion of a truck) creates a "bi-level" trailer design that offers extra interior space in the area over the bed of the truck. As such, modern 5th wheel trailers have evolved to heights over thirteen feet from the ground with the trailer section over the truck bed commonly used for sleeping or living quarters. This movement of the hitch position up has contributed to the performance of 5th wheel systems.

However, this type of 5th wheel hitch can only be used for trucks that have an open truck bed and access to connect the hitch system to the bed and/or frame of the truck. Passenger cars and sport utility vehicles (SUV's) cannot use a 5th wheel type hitch design and, as such, are limited to conventional bumper mounted hitch systems with inherent limitations of weight distribution and trailering stability resulting in passenger cars and SUV's being limited to towing small, lightweight trailers.

A conventional bumper mount system, used in conjunction with a truck, has some distinct advantages and disadvantages. The disadvantages have been described above; however, a significant advantage is keeping the bed of the truck available for other uses while the trailer is connected to the bumper. Most 5th wheel hitch mounts dominate the trucks bed making it unusable for other things.

In virtually every conventional bumper pull or 5th wheel hitch system currently used, the hitch is connected directly (or indirectly) to the structural frame of the towing vehicle. This is to allow the vehicle to effectively support the static and dynamic loads imparted on the vehicle by the trailer during use and operation. This requirement is why some roof mounted systems such as those disclosed in U.S. Pat. Nos. 3,383,119 and 3,692,332 failed. The dynamic loads that the trailer imparted on the roof of the car (during use) simply exceeded the structural integrity of the roof of a passenger car. As such, the entire system failed as the roof section buckled under the dynamic loads and consumers lost faith in the safety of the roof mounted hitch system.

Accordingly, there is a need for improved trailer hitch systems and designs which address the above-noted deficiencies of the prior art.

SUMMARY

In general, the present disclosure provides a telescoping trailer hitch system for a vehicle such as a car, truck, or SUV, and trailer comprising an overcab portion substantially parallel to a roof of the truck. The telescoping trailer hitch system comprises an expansion mechanism support, a piston, series of dampers, an extension tube, and an outer support structure coupled to a hitch connector. The expansion mechanism is within the expansion mechanism support and the piston, the extension tube surrounds the piston, and the outer support structure surrounds the extension tube.

Activation of the expansion mechanism exerts a force on the piston and/or extension tube, causing the piston and/or extension tube, and dampers to slide out of the outer support structure, extending the hitch connector, and deactivation of the expansion mechanism reverses the force on the piston/extension tube, causing them to slide into the outer support structure, and retracting the hitch connector. A hitch receiver for coupling to the hitch connector, the hitch receiver and the hitch connector being substantially even with a roofline of the tow vehicle.

The present disclosure also provides a towable trailer comprising walls and a frame that is at least semi-external to the walls. The towable trailer frame may be comprised of welded beam elements (such as aluminum) to create a truss structure, and the beam elements may protrude beyond the walls.

The present disclosure also provides a trailer entry system comprising a ramp door, wherein the ramp door is attached to a trailer frame and is removed or inserted into a pocket configured in the trailer frame for storage when the trailer is in transit. The ramp door may further comprise a non-skid tape or other friction coating to improve traction in both wet and dry conditions.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein:

FIG. 6A is top view of a hitch system in accordance with the present disclosure;

FIG. 6B is rear view of a hitch system in accordance with the present disclosure;

FIG. 6C is side view of a hitch system in accordance with the present disclosure;

DETAILED DESCRIPTION OF THE ILLUSTRATED EMBODIMENTS

Figure 1A:
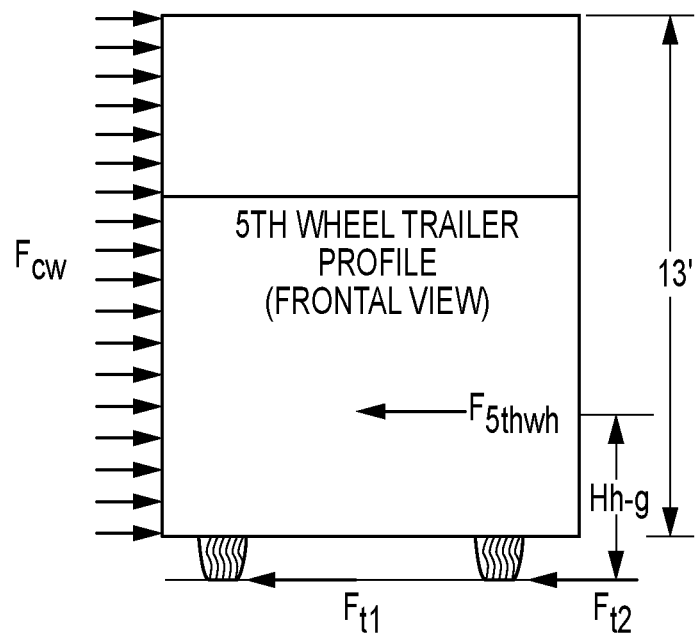
FIG. 1A is a frontal view of a free body diagram of a prior art 5th wheel trailer a bumper pull trailer.

Persons skilled in the art will readily appreciate that various aspects of the present disclosure can be realized by any number of designs and systems configured to perform the intended functions. Stated differently, other methods and systems can be incorporated herein to perform the intended functions. It should also be noted that the accompanying drawing figures referred to herein are not all drawn to scale but may be exaggerated to illustrate various aspects of the present disclosure, and in that regard, the drawing figures should not be construed as limiting. Finally, although the present disclosure can be described in connection with various principles and beliefs, the present disclosure should not be bound by theory.

In general, the present disclosure provides an improved trailer hitch system for vehicles towing trailers that have applicability to everything from cars and light-duty trucks and SUV's to heavy-duty semi-trucks and multi-axle trailers. More specifically, hitch systems in accordance with the present disclosure move the hitch position forward from and higher than the rear bumper of the tow vehicle, thus improving the load carrying capability of the entire vehicle/trailer system by distributing more weight towards the front tires of the tow vehicle, which in turn, improves dynamic stability while towing.

Figure 1B:
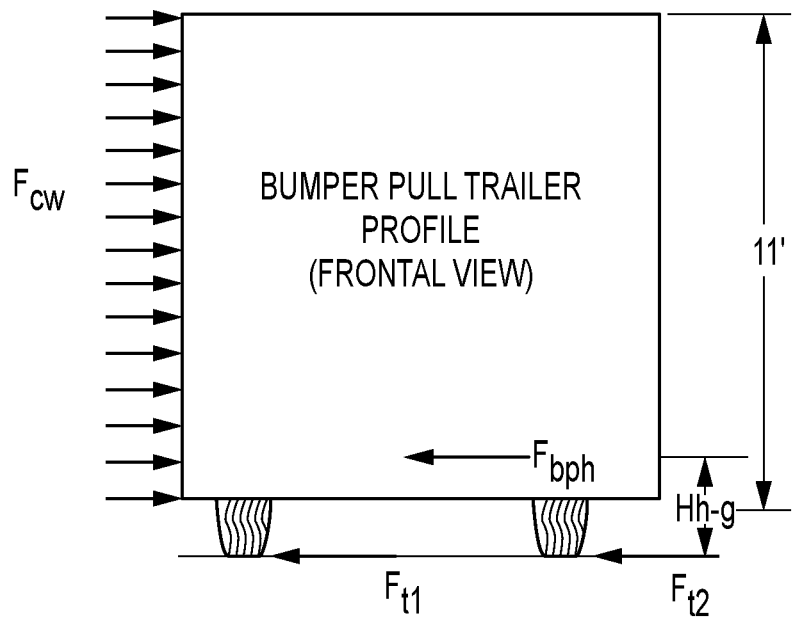
FIG. 1B is a frontal view of a free body diagram of a prior art bumper pull trailer.

This is in part due to the fact that during use in cross winds, the side forces acting on a trailer can be described in a free body diagrams such as illustrated in FIGS. 1A and 1B. FIG. 1A illustrates a 5th wheel trailer and FIG. 1B illustrates a bumper pull trailer. Both are frontal views that show the resulting forces acting on them during a cross wind. In both diagrams, $F_{cw}$ is a distributed side force caused by wind and $F_{t1}$ and $F_{t2}$ are the reactive forces of the trailer tires. For the 5th wheel, $F_{5thwh}$ is the reactive force of the 5th wheel vehicle hitch and $F_{bph}$ is the reactive force of the bumper pull vehicle. In each case, the combined reactive forces must counterbalance the collective wind-force or the trailers may be blown off-course.

The height of the hitch off the ground is shown as $H_{h-g}$ and it is the dimension that is critical to trailer stability when a trailer experiences the type of side loading during cross winds. As shown in FIGS. 1A and 1B, the $5^{th}$ wheel hitch design is much higher than bumper pull designs and as such, they help withstand wind loads more effectively and with more stability. This is why 5th wheel trailer designs can be made taller, such as about 13 feet as shown in FIG. 1A compared to about 11 feet as shown in FIG. 1B, which is more typical for bumper pull trailer designs.

While the benefit of moving the hitch position up from ground level is less obvious that by moving the hitch position both up and forward at the same time, towing stability and resulting vehicle dynamics are improved over prior art 5th wheel and bumper mounted hitch locations.

Figure 2:
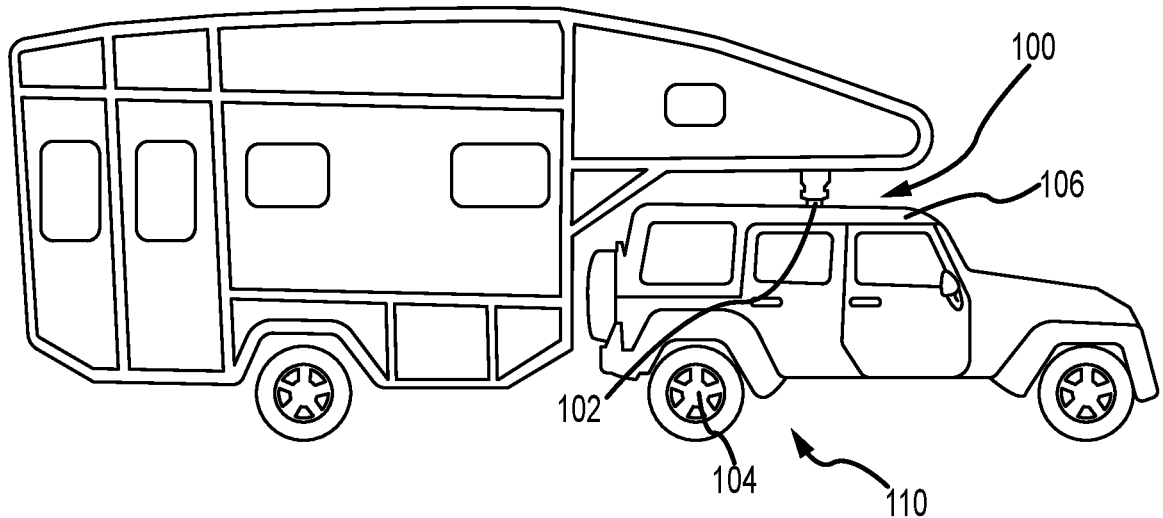
FIG. 2 is side view of an SUV and trailer connected via a hitch system in accordance with the present disclosure.
Figure 3:
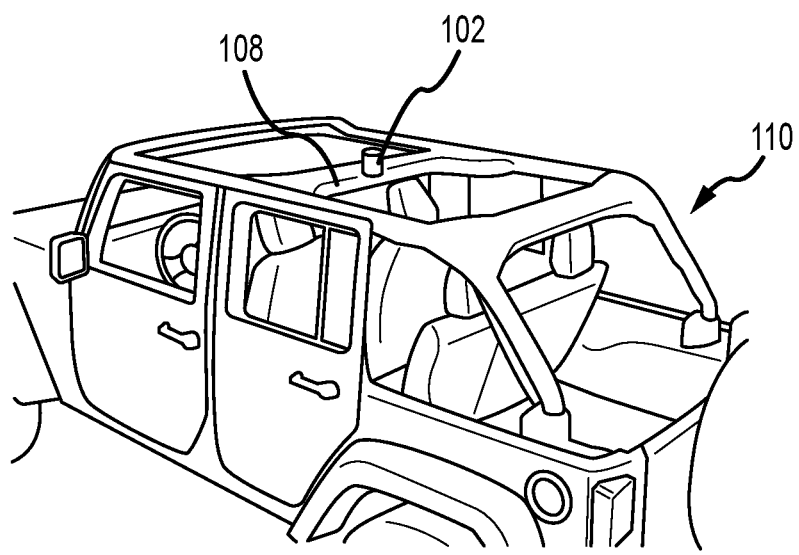
FIG. 3 is perspective view of an SUV and roll bar used with a hitch system in accordance with the present disclosure.

The above being noted, in accordance with various aspects of the present disclosure and with reference to FIGS. 2-3, an example of a hitch system is illustrated. The hitch mechanism itself may be a conventional ball and receptacle hitch of any conventional or unconventional size, now known or as yet unknown and may be secured to the vehicles contemplated herein by structure disclosed herein, as well as other conventional or unconventional mechanisms.

In this embodiment, the hitch system 100 is attached to a Jeep Wrangler style vehicle 110 and a trailer 120 configured for attachment to the hitch system 100. The hitch system 100 moves a hitch mounting location 102 (or "pin position") about 30 inches in front of the rear axle 104 of the vehicle 110, while a conventional bumper hitch mounting location for the vehicle 110 would be about 30 inches behind the rear axle 104. Additionally, in the embodiment illustrated in FIG. 2, the hitch mounting location 102 is also located more than 48 inches higher than the conventional bumper hitch location. One skilled in the art will appreciate however that hitch mounting location 102 may vary both forward and backward from the rear axle 104 and up and down from a conventional bumper hitch location, depending on the particular vehicles used, as well as the trailer used.

Thus, by moving the hitch mounting location 102 in front of the rear axle 104 of the vehicle 110 and above the conventional bumper hitch location, there is an improved distribution of the pin weight of the trailer 120 more evenly over all tires of the vehicle 110, improving the vehicle/trailer system capacity and stability.

In accordance with various aspects of the present disclosure and with reference to FIG. 3, the hitch system 100 comprises a hitch and a hitch connector configured for attachment to a roll bar of the vehicle 110 equidistant from either lateral side of a roof of the vehicle. The hitch system 100 is mounted via the hitch connector through a removable top 106 (which may be soft or hard) of the vehicle 110 and secured directly to the vehicle 110 roll bar system 108, which in turn is securely mounted to the vehicle frame. This rigid connection to the vehicle frame vis a vis the roll bar system 108 is a significant difference from the prior art attachment to a vehicle roof, bumper or 5th wheel.

Figure 4:
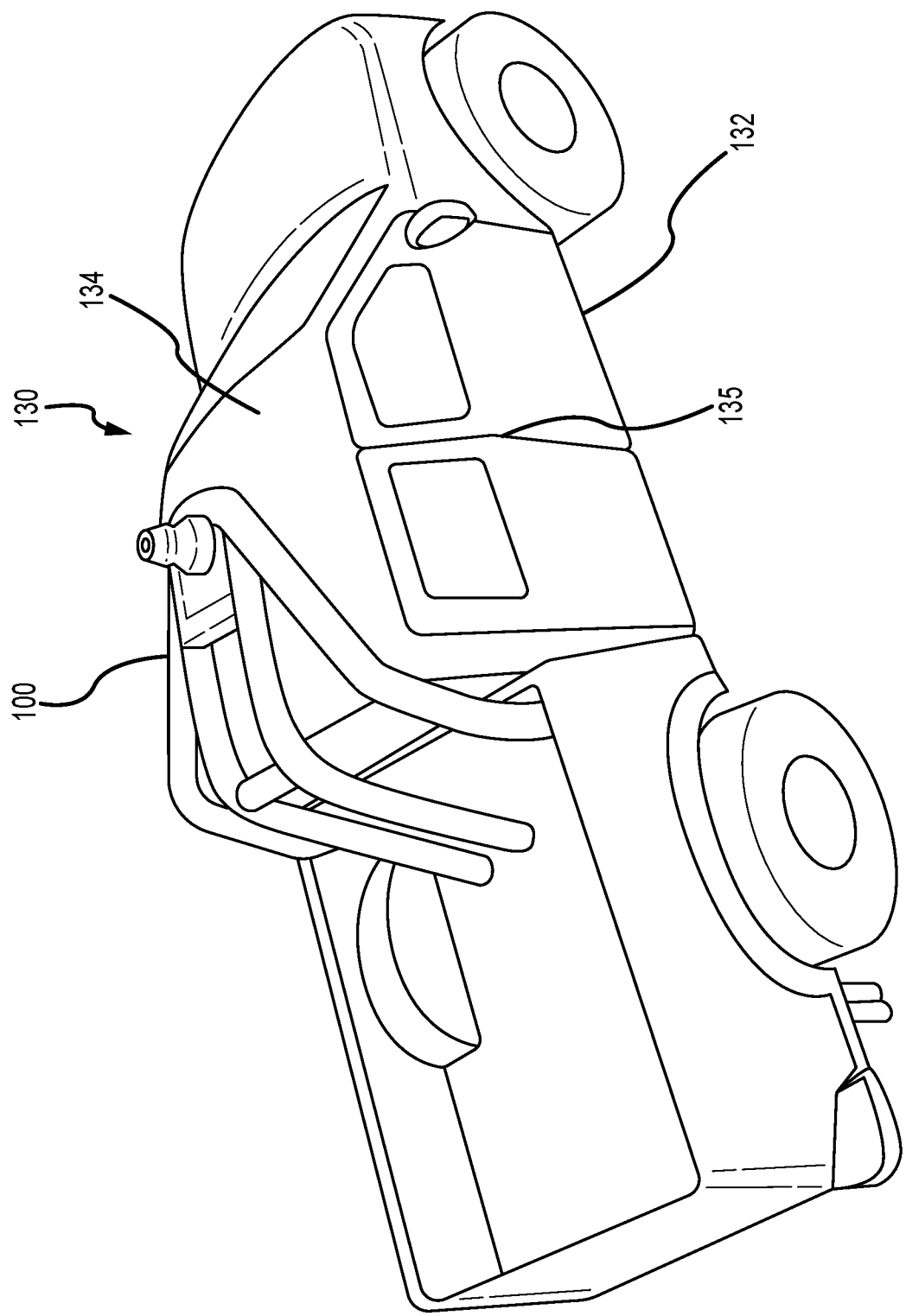
FIG. 4 is perspective view of a truck with a hitch system in accordance with the present disclosure.

A hitch system 100 in accordance with the present disclosure also allows the ability for any vehicle/trailer system where the connection to the tow vehicle can be made directly (or indirectly) to the vehicle frame, including SUV's like the Jeep Wrangler shown as well as conventional pickup trucks. For example, in accordance with an alternative aspect of the present disclosure and with reference now to FIGS. 4 and 5, an alternative example of a hitch system 100 is illustrated. In this embodiment, the hitch system 100 is attached to a conventional, open bed pick-up truck style vehicle 130. Modern pick-up trucks 130 have evolved to include extended cab designs that feature four doors and an extended roof section. A typical truck design 130 is illustrated in FIG. 4. As a result of this evolution, the cab 132 of the truck 130 is typically partitioned by a door pillar 135 (often called a B-pillar) that provides a rigid load path from the roof 134 of the truck 130 to the frame (not shown) in that approximate location. The door pillar 135 location is generally near the center of the wheelbase of the truck 130 and, as such, is an ideal location for the hitch mounting location 102.

Those skilled in the art will appreciate that with a typical 5th wheel hitch attachment, the location of the hitch is usually no more than about 12 inches in front of the rear axle of the truck to which it is mounted, as moving the hitch any more forward creates interference issues between the trailer, particularly the bi-level section found in the area over the bed of the truck, with the cab of the truck.

In contrast, hitch systems 100 in accordance with the present disclosure eliminate this interference issue as it locates the bi-level section of the trailer above the cab 132 and moves the hitch location 102 more than 12 inches in front of the rear axle 104, thereby improving the towing dynamics and load carrying capabilities of the truck 130.

Additionally, in accordance with another aspect in accordance with the present disclosure, the hitch system 100, when used with a pickup truck 130, the ability to retain more of the bed 136 of the truck 130 is preserved when the hitch system 100 is in place. For example, with reference to FIGS. 4 and 5, the hitch system 100 is configured to connect to the frame of the truck 130 through the front portion of the bed 136, extending up and over the cab 132 where it may be secured proximate the door pillar 135 allowing the hitch location 102 to move forward to help distribute the trailer pin-load over all tires of the truck 130.

Figure 5:
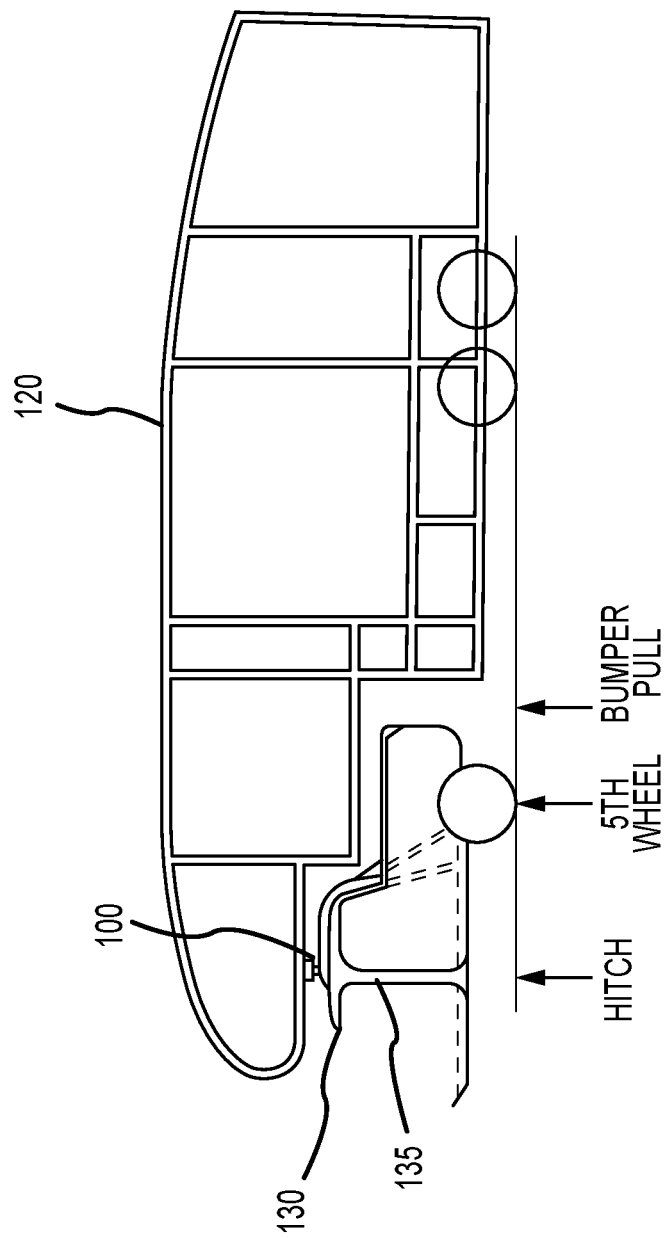
FIG. 5 is side view of a truck and trailer connected via a hitch system in accordance with the present disclosure.

In accordance with various aspects of the present disclosure and with reference to FIG. 5 illustrating a truck 130 and trailer 120 connected using a hitch system 100 as contemplated herein, trailers 120 used in connection with hitch system 100 are of comparable height to conventional bumper and/or 5th wheel trailers and are configured to work with a variety of vehicles. However, the higher and more forward hitch location 102 will make the new vehicle/trailer system much more stable in cross wind situations.

With reference now to FIGS. 6A-6C, close-up views of the hitch system 100 illustrated in FIGS. 4 and 5 are shown. More specifically, hitch system 100 comprises a frame comprised of a plurality of interconnected components. In the presently described embodiment, the components may be hollow steel tubes, though other suitably strong materials such as aluminum, carbon fiber or the like may be substituted. Similarly, the components need not be tubular but rather, may be solid.

As illustrated in FIGS. 6A-6C, the hitch system 100 comprises an overcab portion 150 substantially parallel to the roof 134 of the truck 130. In accordance with the present disclosure, the overcab portion 150 comprises a roof connector 151 located approximately equidistant from either lateral side 152 of the roof 134 and is aligned with the door pillar 135. Attached to the roof connector 151 is a hitch 153 for connecting the trailer 120. With continued reference to FIGS. 6A-6C, a rearward frame portion 155 extends from the overcab portion 150.

In the presently described embodiment, there are two rearward frame portions 155 extending from the overcab portion 150 towards the bed of the truck and the frame underneath. The two rearward frame portions 155 comprise at least two horizontal portions 156 that come together at a point culminating proximate the hitch 153. Additionally, in some embodiments, a rear portion of the overcab portion 150 comprises the at least two rearward frame portions 155. At the lower end of the rearward frame portions 155 are rearward frame connectors 157 for connecting the rearward frame portions 155 to a frame 159 of the truck 130.

In the presently described embodiment, there are two rearward frame portions 155 extending from the overcab portion 150 towards the bed of the truck 130 and the frame 159 underneath. At the lower end of the forward frame portions 154 are forward frame connectors 158 for connecting the forward frame portions 154 to the frame 159 of the truck 130.

In the presently described embodiment, the forward frame portions 154 pass through the bed 136 of the truck 130 and connect to the frame 159 of the truck closer to the cab 132 and the rearward frame portions 155 pass through the bed 136 of the truck 130 and connect to the frame 159 behind the forward frame portions 154. However, in alternative embodiments, the rearward frame portions 155 pass through the bed 136 of the truck 130 and connect to the frame 159 of the truck closer to the cab 132 and the forward frame portions 154 pass through the bed 136 of the truck 130 and connect to the frame 159 behind the rearward frame portions 155. In still other embodiments, the forward frame portions 154 and the rearward frame portions 155 may pass through the bed 136 of the truck 130 and connect to the frame 159 the same distance from the cab 132.

In accordance with various aspects of the present disclosure, the hitch system 100 comprises at least one lateral support portion 160 between the forward frame portions 154 and/or the rearward frame portions 155. In some embodiments, the forward frame portions 154 extend from the at least one lateral support portion 160 to the frame 159. In various alternative embodiments, the hitch system 100 may further comprise an optional roof support frame 161 extending from one lateral side of the truck 130 to the other to further react the vertical pinloads into the pillar 135 and thus, to the frame 159 of the truck 130.

In accordance with various aspects of the present disclosure, the hitch system 100 may comprises an overcab portion substantially parallel to a roof of the truck, wherein the overcab portion comprises a roof support frame 161 extending from one lateral side of the truck to the other and aligned with and connected to a door pillar 135, with a hitch 153 connected to the roof support frame 161. A rearward frame portion 155 with a rearward frame connector extends from the overcab portion. In accordance with various aspects of the present disclosure, the rearward frame portion 155 passes through the bed 136 of the truck 130 and connects to the frame 159.

Figure 7:
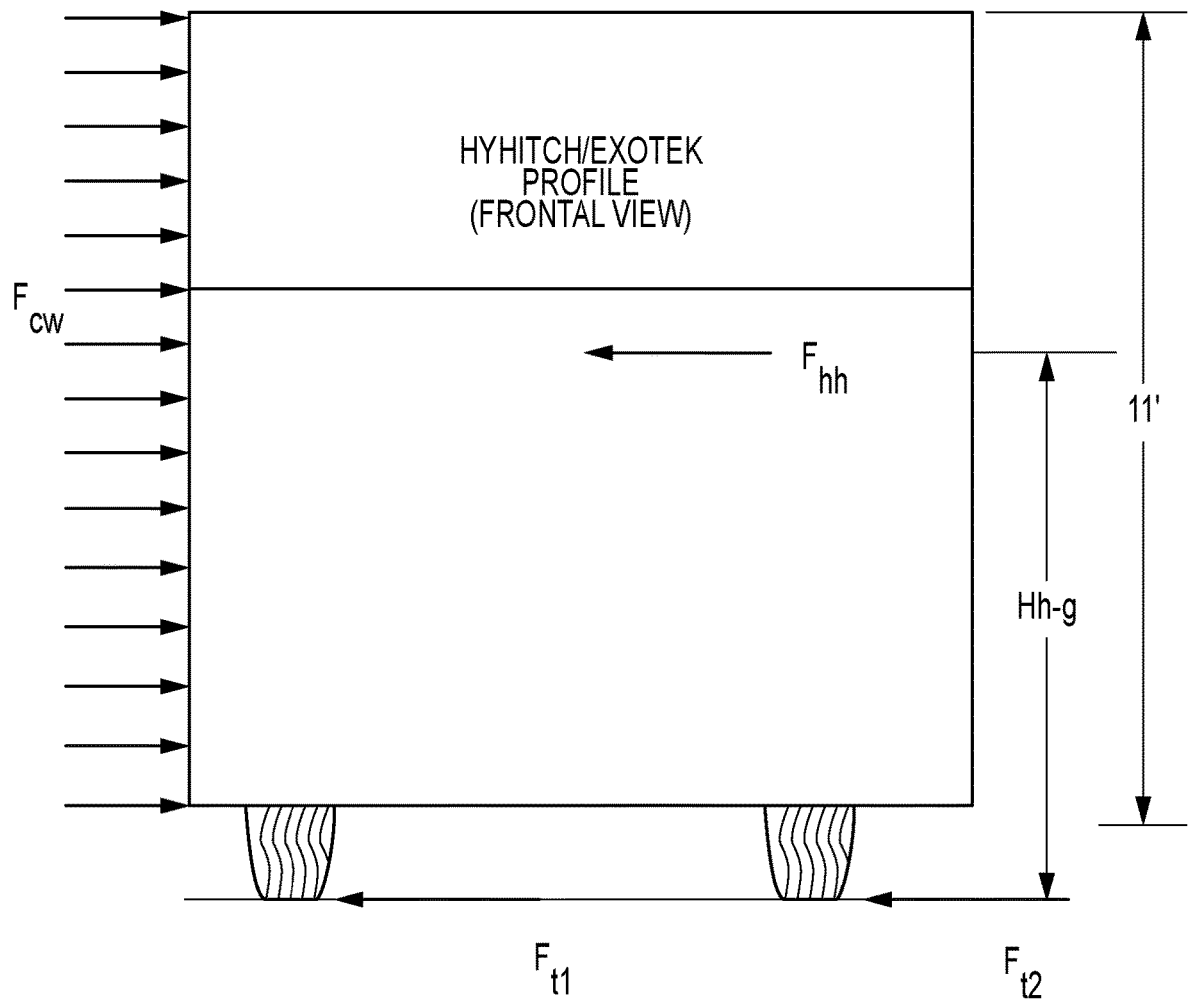
FIG. 7 is a frontal view of a free body diagram of a trailer using a hitch system in accordance with the present disclosure.

With reference to the free body diagram shown in FIG. 7, as shown in the free body diagrams of FIGS. 1A and 1B, $F_{cw}$ is the distributed side force caused by the wind and $F_{t1}$ and $F_{t2}$ are the reactive forces of the trailer 120 tires. With respect to the hitch system 100 used in FIG. 7, $F_{hh}$ is the reactive force of the vehicle hitch and, with reference back to FIG. 1B, $F_{bph}$ is the reactive force of the bumper pull vehicle. In each case, the combined reactive forces counterbalance the collective wind-force or the trailers will be blown off-course.

Because the height of the hitch location 102 is more than 48 inches higher than a conventional bumper mounted hitch position, and as noted in the prior 5th wheel (FIG. 1A) to bumper pull (FIG. 1B) comparison, this dimension significantly improves trailer stability during cross-wind situations. A higher location is more efficient at reacting the distributed wind loads on the side of the trailer.

Moreover, hitch location 102 of the disclosed hitch system 100 is also higher than 5th wheel hitch designs. This hitch location, with over 60 inches of forward movement on a Jeep-style vehicle, creates a new vehicle/trailer system that will be the most stable vehicle/trailer system on the market.

In accordance with various additional aspects of the present disclosure, hitch systems 100 comprise a telescoping trailer hitch system 200 for a tow vehicle and trailer and may include a multi-part, energy-absorbing, telescoping hitch 200 to operate as a load limiter absorbing any sharp load spikes that are common while driving, particularly while off-road driving. The telescoping hitch 200 also improves ride quality during off-road use.

For example, in accordance with the present disclosure, the telescoping trailer hitch system 200 may comprise an expansion mechanism support 260, a piston 261, a series of dampers 202, an extension tube 262, and an outer support structure 263. The hitch connector 264 is attached to the piston 261. An expansion mechanism 201 is constrained within the system by an expansion mechanism support 260, for containing the expansion mechanism 201 while the hitch system 200 extends, including at full extension or anywhere in between. As described in more detail below, the dampers 202 are positioned between the piston 261 and the extension tube 262 as well as between the extension tube 262 and the outer support structure 263.

In accordance with the present disclosure, activation of the expansion mechanism 201 exerts a force on the piston 261 and the extension tube 262, causing either or both of the piston 261 and the extension tube 262 to slide out of the outer support structure 263, extending the hitch connector 264. The dampers 202 provide frictional forces to damp the motion of the sliding tubes. The deactivation of the expansion mechanism 201 reduces the extension force and allows the piston 261 and the extension tube 262 to slide into the outer support structure 263, retracting the hitch connector 264.

A hitch receiver 265 is provided for coupling to the hitch connector 264, wherein the hitch receiver 265 and the hitch connector 264 being substantially even with a roofline 234 of the tow vehicle. In accordance with the present disclosure, the hitch system 200 has at least two height settings.

Figure 8A:
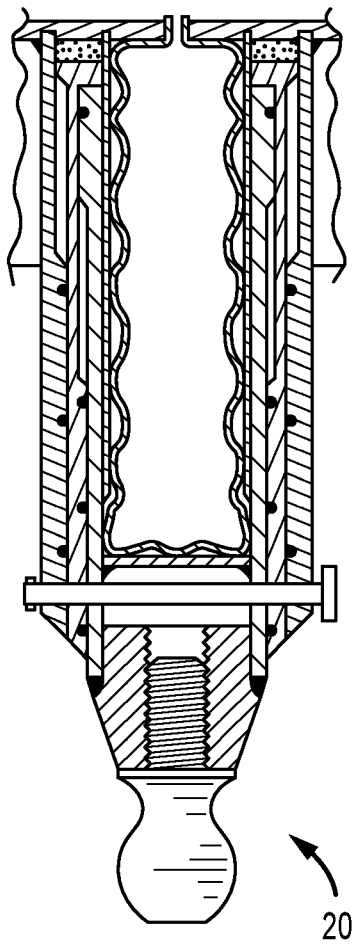
FIG. 8A is a cross-sectional side view of a telescoping hitch in a highway setting.
Figure 8B:
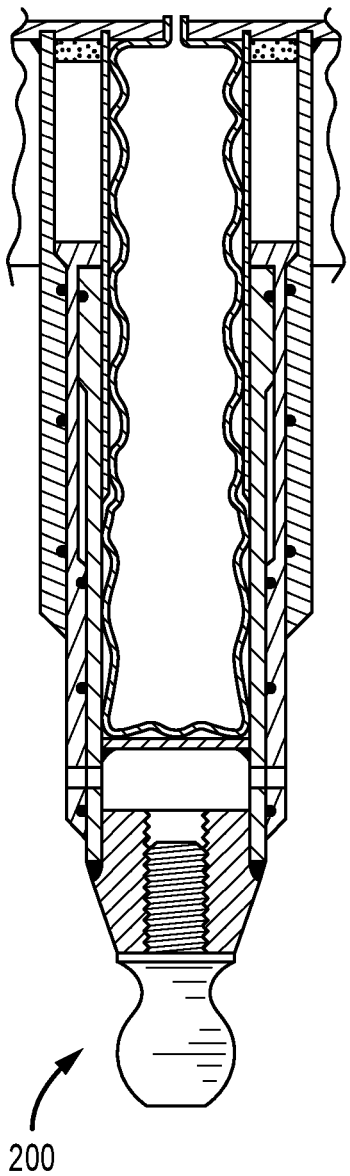
FIG. 8B is a cross-sectional side view of a telescoping hitch in a city setting.
Figure 8C:
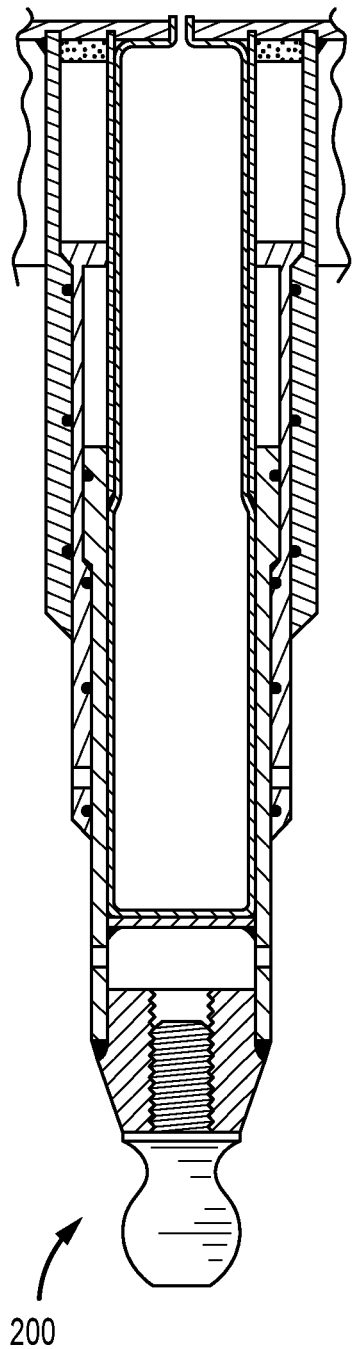
FIG. 8C is a cross-sectional side view of a telescoping hitch in an off-road setting.

An example of such a telescoping hitch 200 in accordance with the present disclosure is illustrated in FIGS. 8A-C and FIG. 9, which shows the hitch 200 in three distinct positions, namely a "highway" setting (FIG. 8A), a "city" setting (FIG. 8B), and an "off-road" setting (FIG. 8C). As shown in these figures, the expansion mechanism 201 may be an internal air bag 201 system, which is used to alter the ride height of the hitch and trailer system as described above, allowing the driver to increase the clearance between the tow vehicle and the trailer and provide added "stroke" of the hitch 200.

Figure 9:
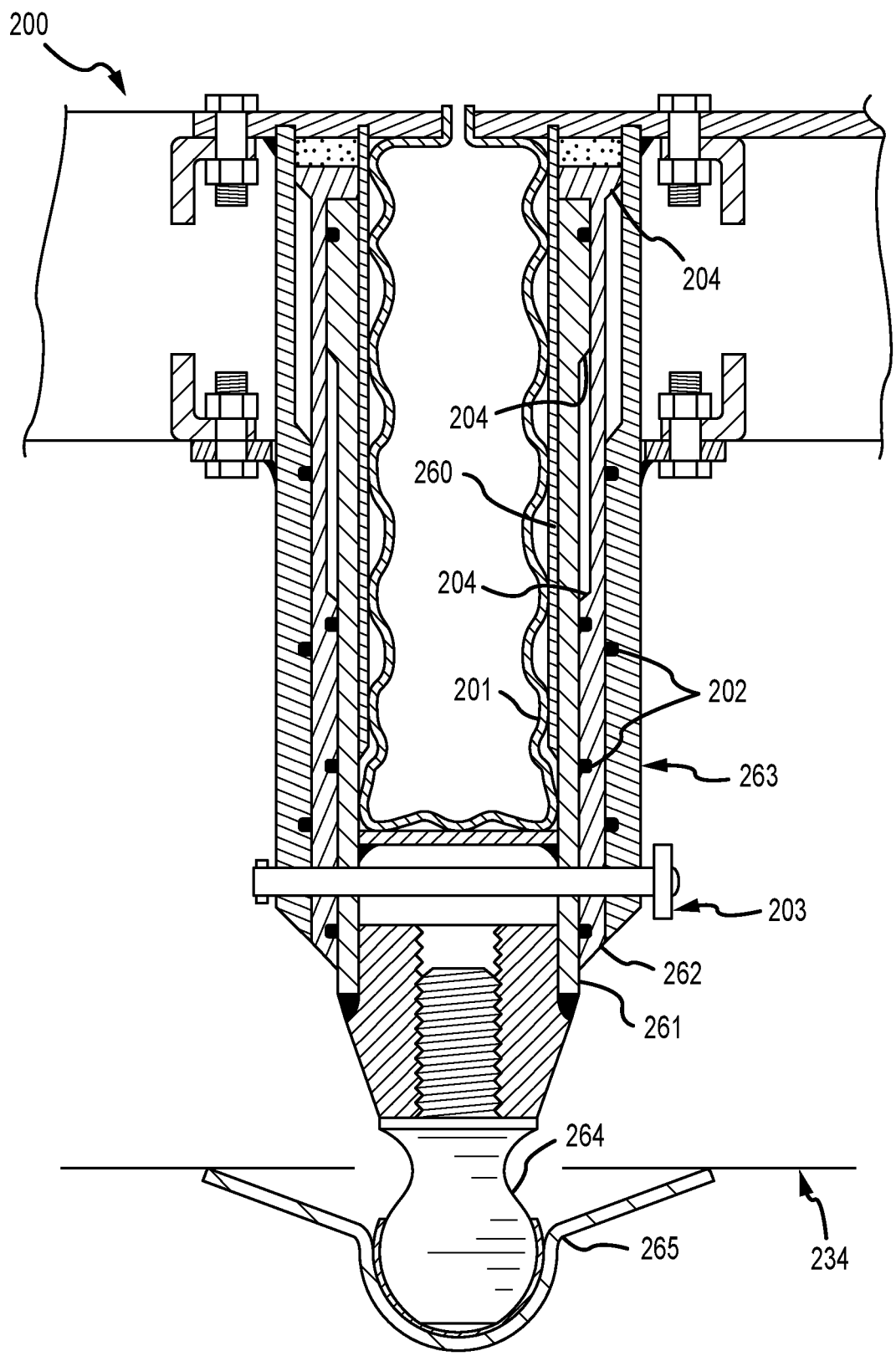
FIG. 9 is a close-up cross-sectional side view of the telescoping hitch of FIG. 8A (highway position) in accordance with the present disclosure.

In this regard, less clearance is required for highway use so the driver can minimize air resistance and maximize fuel economy using the highway setting (FIGS. 8A and 9). Similarly, the need for vertical movement and energy absorption is less as road conditions are typically relatively smooth on highways. In some embodiments, the highway setting is about nine inches from a roofline 234, though the particular distance may vary depending on the conditions, equipment, vehicles, loads and the like.

Adjusting the telescoping hitch 200 to a city mode (FIG. 8B) increases the tow vehicle-trailer clearance to help minimize (or limit) vehicle-trailer interference during moderate dips and road transitions. By increasing the pressure in the internal air bag 201, the user can achieve another ride position which can raise the hitch 200 to provide even more tow vehicle-trailer clearance for maneuvering over off-road obstacles and/or more challenging road conditions. In some embodiments, the city setting is about twelve inches and the off-road setting is about fifteen inches (FIG. 8C) from a roofline 234, though the particular distance may vary depending on the conditions, equipment, vehicles, loads and the like.

As will be appreciated by those skilled in the art, depending on the controls and the application, the air bag 201 may be infinitely adjustable to any number of settings depending on the environment and desired ride. In this regard, the presently described hitch system 200 is an ideal complement to an adjustable air bag suspension on the actual trailer and an operator may be able to adjust the ride height of both the trailer and the telescoping hitch 200 (for more trailer to tow vehicle clearance) at the same time through a single programmable controller located within reach of the driver. This adjustment can be done "on the fly" during vehicle/trailer operation.

The specific dimensions, materials and design of a particular telescoping hitch system 200 will depend upon the tow vehicle/trailer used as well as the intended usage. Although the system shown in FIGS. 8A-C and 9 shows two extendable elements (and one fixed element), the same telescoping function can be accomplished with as few as two moving parts (one fixed and one extending).

For example, FIGS. 8A-C and 9 show the use of an air bag 201 as the spring, however other springs such as conventional steel coil springs or elastomeric materials can be used as well. FIG. 9 shows the telescoping hitch 200 in an un-extended (i.e., highway) position and highlights the details of one application of the present invention. This includes a "damping" feature intended to minimize the undesirable oscillations or movements of the various elements during use. Similar to the shocks used on conventional cars to damp the movement of the suspension, which improves ride quality, FIG. 9 illustrates a series of O-ring friction dampers 202 that help dissipate energy and deliver a more controlled ride. This is done by converting the kinetic energy of the system to heat in each location. The system is designed to have more of these friction dampers "in play" as the telescoping hitch 200 extends. Those skilled in the art will appreciate that any number of such dampers 202 may be employed depending on the particular application.

As FIG. 9 shows, only three of the O-ring dampers 202 are likely to see much relative movement during city setting, however all seven illustrated O-ring dampers 202 are likely to be activated during off-road setting. These O-ring dampers 202 also help isolate the various telescoping structural members from each other, eliminating ratting related noise during operation/motion. This isolation of the moving elements will also help minimize premature wear and damage of the moving parts. It should be noted that other types of damping mechanisms may be incorporated in accordance with the present disclosure as well, such as the type of fluid/valve by-pass mechanisms used in conventional vehicle shock absorbers.

Another benefit of a telescoping hitch 200 is the energy-absorption and damping of the connection/motion between the trailer and tow vehicle. This is especially valuable during rougher off-road conditions and will help improve the ride quality of the trailer/tow vehicle system during use. For example, the telescoping hitch 200 illustrated in FIGS. 8A-C and 9 also features mechanical limit stops 204 that allow the full range of desired motion to occur but limits over-extension. These limit stops 204 permit the hitch 200 to extend to pre-determined limits but prevent it from extending beyond those limits. These limit stops 204 make sure the hitch 200 cannot "come apart" during use, creating a dangerously unsafe uncoupling of the trailer and tow vehicle.

In accordance with the present disclosure, another feature illustrated in FIG. 9 is a locking mechanism such as a T-Pin 203 which can be used to temporarily eliminate any telescoping motion in the hitch assembly. This can be valuable under certain circumstances, such as high-speed highway conditions, where stability is more important than energy absorption or ride quality. The T-Pin 203 helps eliminate any relative motion between the tow vehicle/trailer, creating a rigid connection similar to conventional hitch designs, providing additional safety during high-speed highway conditions. The T-Pin 203 can be easily removed when conditions warrant (i.e., lower speeds) allowing the telescoping elements to function again.

Another safety related benefit of the telescoping hitch system 200 relates to trailer dynamics. It is generally known that in conventional trailing systems there is an ideal range of pin-loads that deliver the best dynamic stability during operation. This range is commonly believed by those skilled in the art to be about 10-15% of the trailer weight. So, for example, a 3,500 pound trailer should have 10-15% of its total weight (or 350-525 pounds) distributed on the "pin" or ball. The balance is of the trailer weight is then supported by the trailer tires. If there is too little weight on the pin (i.e., less than 10%), or too much (i.e., in excess of 15%), the tow vehicle/trailer system can behave erratically in use, creating an unsafe condition. This distribution of a trailers weight is an important safety element and while it is common for users to know their total trailer weight, it is less common for users to know how much of that trailer weight is on the tow vehicles pin/ball.

The telescoping nature of hitch systems 200 in accordance with the present disclosure offers a unique solution to this dilemma. Once the actual dimensions of a specific hitch design is established, the air bag pressure can be calibrated to correspond to the related loads or forces that hitch can support. For example, the design shown in FIG. 9 features a 2.5 inch I.D. tube that results in 4.9 square inches of internal surface area. An internal air bag would thus require about 71.4 psi to deliver 350 pounds (10%) of support and 107 psi to deliver 525 pounds (15%). Therefore, before use, an operator could check the pressure required to "extend" (or move) the telescoping elements of the hitch 200 and by doing so, they could thus confirm how much load is on the pin. If it was then outside of the projected safe 10-15% range (or 350-525 pounds for a 3,500 pound trailer) the operator could make the required load distribution adjustments to make sure the entire vehicle/trailer system will be operating within a safe range.

In accordance with various additional aspects of the present disclosure, new designs and fabrication of the structural elements of the trailer frame and sub-structures are provided. For example, trailers contemplated herein may comprise a true aluminum space frame that includes side walls, roof and floor beams.

Figure 10:
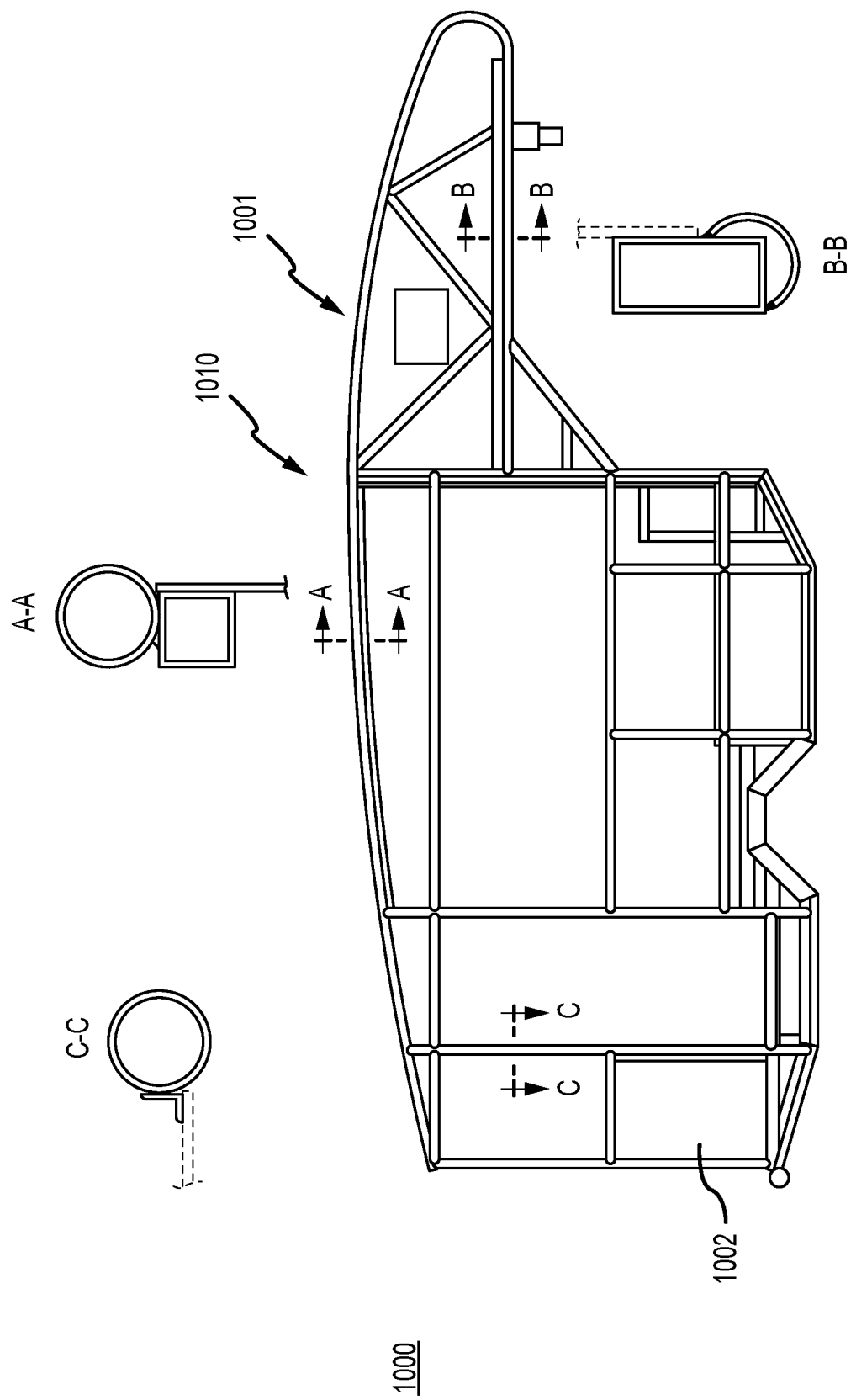
FIG. 10 is a side view of a trailer frame in accordance with the present disclosure.

In this regard, in accordance with various aspects of the present disclosure, FIG. 10 shows a side view of a trailer space frame 1000 incorporating such a design, which uses a series of small light-weight tubular beam elements 1001 welded together to create an efficient truss type structure. FIG. 10 also shows cross-sections (A-A, B-B, and C-C) of such a frame 1000, illustrating how multiple beam elements 1001 sections can be combined to achieve the required function(s) of each part of the frame 1000. This includes creation of the load-carrying structure as well as providing support for the corresponding side wall panels 1002. The beam elements 1001 may comprise any suitable material, such as, for example, aluminum, which is light-weight compared to steel, but when configured in a frame 1000 as contemplated herein exhibits improved strength and rigidity.

Figure 12:
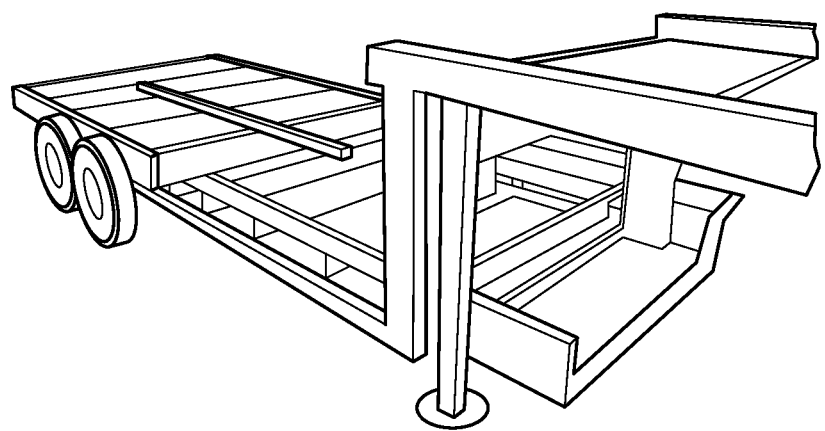
FIG. 12 is a perspective view of a prior art steel floor level type ladder frame used in conventional trailer designs.

Structures such as those illustrated in FIG. 10 create an efficient space frame type structure for the trailers frame and is more efficient than a floor level only steel beam type structures used in conventional prior art trailers (as illustrated in FIG. 12). The resulting space frame 1000 of the present disclosure transfers the dynamic loads of the trailer to the tow vehicle/hitch at the higher location of the hitch systems in accordance with the present disclosure, as compared to conventional bumper pull or 5th wheel trailers. This type of space frame 1000 is stiffer, stronger and lighter than conventional floor level only steel frames and is more suited to the higher hitch location of the present invention.

Figure 11:
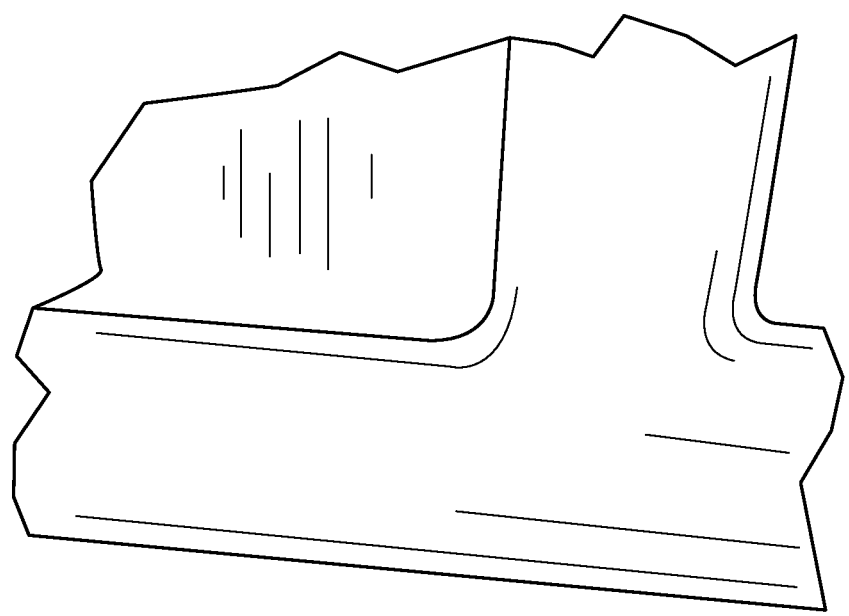
FIG. 11 is a close-up perspective view of structural beam elements and recessed trailers side wall panels in accordance with the present disclosure.

In accordance with another aspect of the present disclosure, desirable and beneficial aesthetics of the trailer may be realized. To that end, as can be seen in FIG. 11, many of the beam elements 1001 of the structure protrude beyond the exterior surfaces of the trailer, so they will remain visible. This design positions these primary structural beam elements 1001 in a more efficient position by spacing them far apart, compared to the floor level "ladder type" frames (FIG. 12) used in conventional prior art trailer designs. Conventional floor level steel ladder frames derive their stiffness and strength from heavy main steel frame rails located at the bottom (or below the floor) of the trailer frame. The stiffness and strength of a conventional floor level steel-based ladder type frame is established by the size of the main beams.

In contrast, with trailer frames 1000 in accordance with the present disclosure, the strength and stiffness of the overall frame 1000 is established by both the size of the beam elements 1001 as well as their location within the structure of the frame 1000. In the present disclosure, the exposed structural beam elements 1001 at the outermost edges, or perimeter of the frame 1000, are true stressed load carrying members. Although they may also add an aesthetic element as a secondary benefit, their primary function and benefit are as structural elements of the overall frame 1000.

The space frames 1000 described herein move the structural beam elements 1001 throughout the entire height of the trailer frame 1000, and may even extend all the way to the very top 1010 of the trailer (e.g., FIG. 10). Thus, such frames 1000 are more structurally efficient than conventional floor level ladder frames because moving these load carrying structural beam elements 1001 to the far outer edge, or perimeter of the frame 1000, create a much higher moment-of-inertia for the entire trailer structure.

By comparison, a floor only level steel ladder type frame might be about 6-12 inches in total height and the resulting moment of inertia properties of the frame are derived from these dimensions. In contrast, a space frame 1000 type structure such as the shown in FIG. 10 creates a multi-element truss structure that is about nine feet (or about 108 inches) in height. As such, the resulting moment of inertia (MOI) properties are also derived from these dimensions and helps this type of frame far exceed the performance of floor only level designs.

Additionally, the moment of inertia formula for beams commonly takes this height (H) dimension and apply it to a 4th power. As such, even small increases in a beam height can add significantly to its MOI. In the case of frames 1000 in accordance with the present disclosure, the separation of the structural beam elements 1001 to the outer most perimeter of the frame 1000 (i.e., at the far bottom and top 1010 of the truss frame) creates a much stiffer and stronger structure by increasing its MOI properties substantially.

Moreover, the exposed nature of the frames structural beam elements 1001 may also help communicate an improved visual indication of strength and stability of the frame 1000. These beam elements 1001 that remain visible, extending beyond the trailers exterior walls, will look very much like the roll bars commonly used in other high-performance off-road vehicles, communicating improved safety, stability, security and strength. The frames 1000 exposed beam element 1001 sections can also be painted in high contrast colors to help accentuate their presence.

The welds used to connect these exposed "visible" beam elements 1001 in the frames can also be done with a tungsten-inert-gas (TIG) welding method, which produces a distinctive dime-on-dime pattern that functions a quality indicator of the trailer (FIG. 11).

Additionally, many trailers that commonly referred to as "toy haulers" incorporate a rear door that doubles as a ramp to help load motorcycles, ATVs and such into the trailer. These ramp doors also function as floor sections to create outdoor patios when the door is down and the trailer is parked. This helps extend the "living space," opening up more room in the back of the trailer. This patio floor function is created when the door is open (or in the down position); however, when the door is up (or closed), the rear section of the trailer can take on a cave like feel as the ramp doors never have windows. This limits the natural light that can get into that portion of the trailer.

Thus, in accordance with various additional aspects of the present disclosure, trailer design disclosed herein may incorporate functioning windows into the rear ramp door, including a built-in grate and/or shutter system that protects the window opening(s) when the ramp door is being used as a ramp or as a floor in an outdoor patio mode. When the ramp door is up (or closed) the grates or shutters can then be opened to expose the windows and allow light to enter the rear of the trailer.

in accordance with various additional aspects of the present disclosure, the ramp door design may include a small raised "lip" around the perimeter of the ramp/patio door to create a small "floor-railing" designed to keep chairs from sliding off the edge. The surface of the patio is typically about 2-3 feet above grade when the patio function is in use. With a small area (e.g., about 7×7 feet), space is limited and when table and chair are used, it is possible that an inadvertent slide of a chair could allow a leg to slip over the patio edge causing a potentially dangerous fall. Thus, a small (e.g., 0.5 inches) raised lip would help stop a chair from sliding off the ramp door. The raised lip can also be incorporated into the structure of the ramp door increasing the rigidity of the door/floor.

In accordance with various additional aspects of the present disclosure, the trailer design can maximize the amount of time a user can function in an off-grid situation. For example, a typical limiting issue is the amount of fresh water a trailer can hold. It is not uncommon for small trailers (like the Jeep version shown on page-6) to carry only 20 gallons of fresh water. A typical RV trailer also contains "grey" water (which is water that has already been used for cleaning) and "black water" (which is water that has flowed out from the toilet and is therefore mixed with human waste) tanks.

Thus, in accordance with the present disclosure, redirecting (or recycling) the "grey" water to flush waste into the black water tank uses or conserves fresh more efficiently. For example, where a conventional RV system uses fresh water to operate the toilet (creating black water), trailers in accordance with the present disclosure recycle the grey water and use it in the toilet. As such this water will have been used twice, first for whatever cleaning function it did and second for operating the toilet. The grey water may have soap or food residue, so a simple filter can be set up in line to remove the same before using the filtered grey water to flush the toilet.

Typical RV trailers use a folding step/stair system to enter the RV and because of space limitations (to store the folded unit), the steps are commonly fairly narrow. This can create a bit of a challenge and a safety hazard, especially when exiting the RV. This hazard increases significantly if a user is carrying anything that obscures their vision looking down. Similarly, any small error in foot placement on a conventional step system can result in a fall and this is especially true when the steps are wet.

Figure 13:
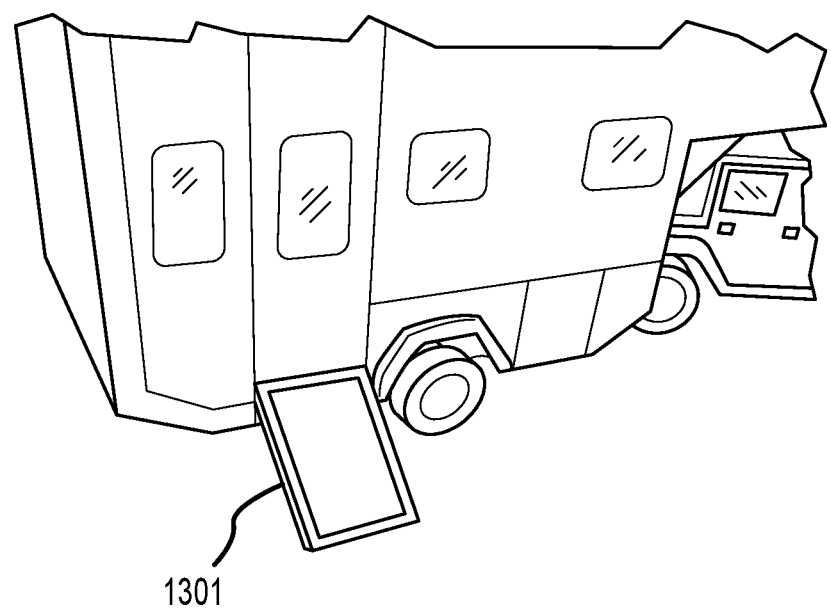
FIG. 13 is a perspective view of a ramp entry in accordance with the present disclosure.

Thus, in accordance with various additional aspects of the present disclosure, another novel feature of the trailers contemplated herein is a ramp door entry system as shown in FIG. 13. The benefit of the ramp door entry system instead of steps is ease of use and safety as a ramp entry/exit system does not require as precise a placement of your feet, as a step design. The ramp 1301 attaches securely to the trailer frame 1000 and provides a stable, secure way to enter and exit the trailer. The ramp 1301 can also be fitted with non-skid tape or coating to improve traction in both wet and dry conditions. The ramp entry door can then be easily removed and/or slide into a pocket built into the frame for storage when the trailer is in transit.

In accordance with various additional aspects of the present disclosure and as noted above, trailers contemplated herein may be used for off-road and/or off-grid use. Such use requires the trailer to be as light as possible and be as immune to the elements as possible.

However, virtually every conventional RV design currently used incorporates traditional plywood into their construction. Plywood is a material is hydroscopic, meaning it can readily absorb moisture from the air, which creates many long-term problems in RV applications including delamination and warpage, which is made worse by the kind of thermal cycles that most RVs encounter. When used in floors, roofs or side walls, any delamination or warpage can destroy the integrity of the resulting system. Because the plywood absorbs water, when the trailer is exposed to large thermal cycles (hot or cold) the resulting expansion and contraction of the "wet" plywood causes the trailer to deteriorate from the inside out.

In contrast, trailers described herein feature a new waffle grid plastic based system referred to as a Waffle Grid Panel or WGP to alleviate the issues surrounding plywood. WGP are injection or compression molded from different polymers that are not hydroscopic and as a result, WGP are more dimensionally stable when exposed to thermal cycles. The "grid" portion of the design is a network of intersecting raised ribs that add stiffness to the panel. WGP are designed to be lighter than conventional plywood but have comparable stiffness. They can be used in any application that uses plywood, such as floors, roofs, side-walls, interior dividing walls, cabinets and the like. While the initial applications for these WGP are in the RV industry with ExoTek™ trailer design, it should be evident that the possible applications include anywhere that plywood is used and weight and/or dimensional stability are important.

In accordance with various aspects of the present disclosure, WGP may have tongue and groove type indexing that is incorporated into the sides of each panel to help maintain the panel-to-panel alignment and fit in multi-panel assemblies. Such indexing feature can be done many different ways. For example, a panel may use a bull-nose male-female design but any feature that helps align the top/bottom surfaces and provides some transverse shear capability to a panel connection should be covered by this application.

It should also be evident that all plastic materials, including recycled materials, may be used in the WGP system. This includes unreinforced polymers (e.g., ABS or polycarbonate) or fiber reinforced polymers as well, for applications that desire more stiffness and/or strength.

For applications that demand the highest stiffness possible, WGP can also incorporate an integral wire tensioning system on the grid side. The purpose of the tensioner system is to add a localized element to the panel that when the panel is loaded, is put in tension. In applications like flooring, where WGP are used as part of an overall system, tension wires can be incorporated into the WGP system to help stiffen the overall floor. In many cases, these tension wires are buried under flooring material that is used in conjunction with the WGP sub-floor.

Because the trailer design may be used for off-road/off-grid type use, it is likely to encounter inclement weather. High wind can be problematic for any lightweight trailer design. As such, a in accordance with various aspects of the present disclosure, an earth-anchor system designed to secure the trailer firmly to the ground. The earth-anchor system may include integral attachment points built into the frame and secondary anchors that screw into the ground. Ideally this is done at all four corners of the trailer, though as few as one anchor fall within the scope of the present disclosure. The earth-anchor system not only provides added safety and security during high-winds, anchoring the trailer to the ground also provides much better stability during normal everyday use. For example, a lightweight trailer can feel very unstable when moving around in it and having it secured directly to the ground will make it feel more solid.

As mentioned earlier, conventional trailers have wall and roof sections that are "pre-made" as large flat panels that then attach to the floor. These panels have foam built into the center of those panels and that creates an insulated wall or roof section.

However, because trailers as contemplated herein have a super-structure frame built first, the process of adding insulation is different and in this case, the process adds performance benefits as well. In this regard, in accordance with various additional aspects of the present disclosure, the trailer frame is covered with exterior panels, such as conventional fiberglass panels or WGP panels, including the side walls, roof, floors and even storage compartments. This may be done with adhesives, such as epoxy or 3M VHB tape.

Once the frame is "skinned" in this manner, it can be sprayed with conventional 2-part spray foams which function to seal the entire trailer from air and moisture penetration. But because these 2-part spray foams are closed-cell foams, which are more rigid that than the foam board used in conventional trailer walls/roofs, the resulting structure can be designed to be either stiffer (at the same overall thickness) or lighter (allowing the stiffer frame/foam design to make the wall/roof thinner).

In the case of WGP, the open grid design also helps provide a mechanical lock to the spray foam, resulting in an even stiffer/stronger wall/roof system. This new approach will help the trailer last longer and improve the performance and comfort for its occupants.

Finally, it will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of composition, ingredients, structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

I claim:

1. A telescoping trailer hitch system for a tow vehicle and trailer, comprising:
   an expansion mechanism support, a piston, an extension tube, and an outer support structure coupled to a hitch connector, wherein:
   an expansion mechanism is within the expansion mechanism support and the piston, the extension tube surrounds the piston, and the outer support structure surrounds the extension tube, and wherein,
   activation of the expansion mechanism exerts a force on the piston and the extension tube, causing the piston and the extension tube to slide out of the outer support structure, extending the hitch connector, and wherein deactivation of the expansion mechanism exerts a force on the piston and the extension tube, causing the piston and the extension tube to slide into the outer support structure, retracting the hitch connector; and a hitch receiver for coupling to the hitch connector, the hitch receiver and the hitch connector being substantially even with a roofline of the tow vehicle.

2. The telescoping trailer hitch system for a tow vehicle and trailer of claim 1, further comprising at least two height settings.

3. The telescoping trailer hitch system for a tow vehicle and trailer of claim 2, wherein the hitch receiver and the hitch connector may be extended and retracted between a highway setting, a city setting, and an off-road setting.

4. The telescoping trailer hitch system for a tow vehicle and trailer of claim 2, wherein the hitch receiver and the hitch connector may be extended and retracted to any height setting.

5. The telescoping trailer hitch system for a tow vehicle and trailer of claim 2, wherein the hitch receiver and the hitch connector may be extended and retracted during vehicle/trailer operation.

6. The telescoping trailer hitch system for a tow vehicle and trailer of claim 2, wherein the expansion mechanism is an air bag.

7. The telescoping trailer hitch system for a tow vehicle and trailer of claim 1, wherein the hitch receiver and the hitch connector are a conventional ball and receptacle hitch.

8. The telescoping trailer hitch system for a tow vehicle and trailer of claim 1, further comprising damping mechanisms.

9. The telescoping trailer hitch system for a tow vehicle and trailer of claim 8, wherein the damping mechanisms are O-ring friction dampers.

10. The telescoping trailer hitch system for a tow vehicle and trailer of claim 8, wherein the damping mechanisms are fluid/valve by-pass mechanisms.

11. The telescoping trailer hitch system for a tow vehicle and trailer of claim 1, further comprising at least one limit stop limiting a range of motion of the telescoping trailer hitch system.

12. The telescoping trailer hitch system for a tow vehicle and trailer of claim 1, further comprising locking mechanism that locks the telescoping trailer hitch system in place.

13. The telescoping trailer hitch system for a tow vehicle and trailer of claim 12, wherein the locking mechanism is a T-Pin.

* * * * *